Figure 1:
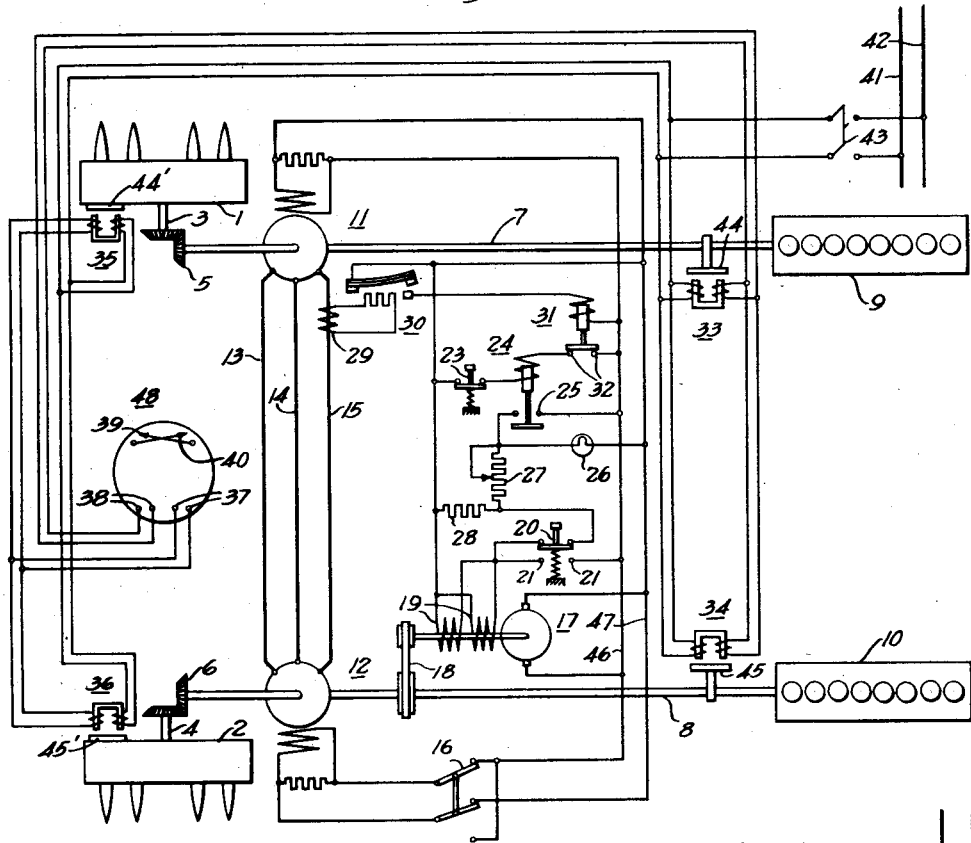

Sept. 20, 1938. H. WOLTERS 2,130,866

ELECTRICAL INTERLOCK FOR DRIVE SHAFTS

Filed Aug. 1, 1936

WITNESSES:
Michael Stark
Wm. C. Groome

INVENTOR
Hans Wolters.
BY
Paul E. Friedemann
ATTORNEY

Patented Sept. 20, 1938

2,130,866

UNITED STATES PATENT OFFICE 2,130,866

ELECTRICAL INTERLOCK FOR DRIVE SHAFTS

Hans Wolters, Wuppertal-Elberfeld, Germany, assignor to Westinghouse Electric & Manufacturing Company, East Pittsburgh, Pa., a corporation of Pennsylvania Application August 1, 1936, Serial No. 93,814
In Germany June 6, 1935

4 Claims. (Cl. 172—293)

This invention relates to means for transferring two or more machine elements operating asynchronously to isochronous operation.

When two or more drive shafts, operating with non-uniform drive moments relative to each other, are present in a plant, the danger arises that oscillations will be produced by the shafts. The result of these oscillations are vigorous vibrations, particularly if the shafts are mounted on the same foundation. It is known that such oscillations may be avoided by taking care that the shafts during operation are disposed at a predetermined spacial angle with reference to each other. For this purpose it has been proposed that the shafts be coupled to synchronous machines. These machines are first synchronized and thereafter, by interchanging the poles of the excitation winding of one of the synchronous machines to rotate one of the shafts with reference to the other until the two shafts run in the desired spacial relative position with respect to each other, so that the oscillations are thereby suppressed.

The object of the invention is to provide a device with the aid of which three or more shafts, which may give rise to disturbing oscillations, are so adjusted that all of the shafts rotate in such a position relative to each other that a minimum of oscillations results.

According to the invention, an impulse producer is tied up with each shaft for this purpose, and all of the impulse producers operate synchronously either on an indicating device, or a regulating device depending on whether the final operation of two or more shafts is to be effected manually or automatically. The invention is of particular significance in a plant where at least two groups of shafts are present and in which the oscillation producing moments arise in mutually different rhythms. The device according to the invention is in such a case preferably so constructed that the impulses produced by the impulse producers by each of the groups of shafts are so combined in the indicating device or regulating device, as the case may be, that the desired relative synchronous running of the shafts which operate in equal rhythm and instantaneously belong to a single shaft group are indicated separately. This case arises for example in plants with a plurality of driving aggregates in which each driving aggregate is provided with two shafts positively coupled with each other by mechanical or electrical means and whereby a non-uniform driving moment in different rhythm is exerted on each of the shafts. This occurs for example in a ship propeller drive which is equipped with two Voith-Schneider propellers of which each is directly driven from a Diesel engine through a mechanical translation drive. If, in plants of this character, the object is to suppress as much as possible the oscillations produced by the shafts with the aid of synchronous machines running together, and to arrange the drive shafts in the proper relative position for such suppression of the oscillations, it will be found that the proper relative position of the shafts is dependent on the following driving parts, namely, on the number of propeller blades on each Voith-Schneider propeller, on the number of cylinders in the driving Diesel engines, on the rhythm relationship of the Diesel engines, on the number of poles of the synchronous machines, and on the translational relationship of the drive between the Diesel engine shaft and the propeller shaft. According to the relationship of the drive between these individual parts, the shaft carrying the equalizing machine of one drive system takes up a position relative to the shaft carrying the equalizing shaft of the other drive system after a greater or smaller number of rotations which is of such character that the oscillations exerted by the shafts are suppressed. The invention makes possible in this case a sure and quick adjustment of the proper relative position of the drive shafts by the application of very simple means.

Figure 2:
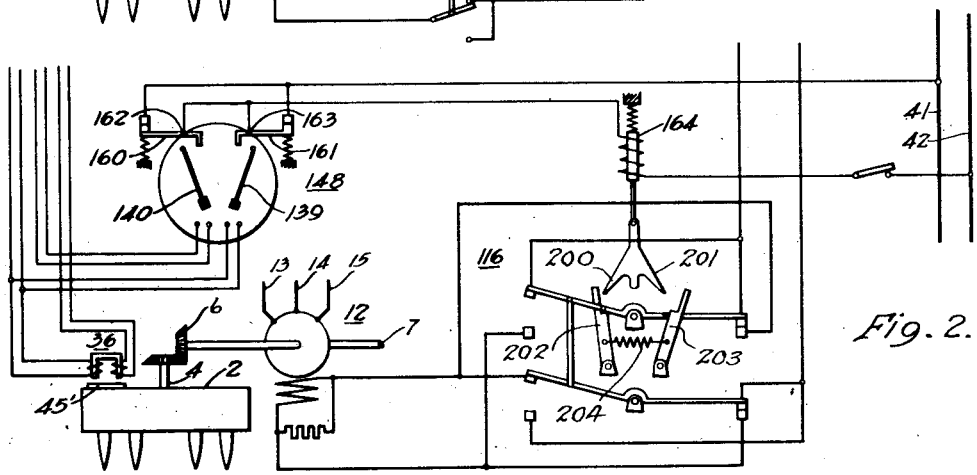

The invention is illustrated in the accompanying figures of the drawing and in which:

Figure 1 illustrates the invention more or less diagrammatically as combined with manually control means; and Fig. 2 illustrates a modification of the invention showing some of the subject matter shown in Fig. 1 in combination with means for automatically effecting the proper relative operating position of several machine elements.

Two Voith-Schneider propellers are indicated by the numerals 1 and 2. Each propeller has, for example, four propeller wings. The corresponding propeller shafts 3 and 4 are driven through corresponding transmission gears 5 and 6 by the Diesel engines 9 and 10 through shafts 7 and 8. Synchronous machines 11 or 12 are coupled with each of the two Diesel engine shafts. These machines have the task of maintaining the proper spacial relative relationship of the shafts. The rotors of the synchronous machine are permanently connected with each other through the conductors 13, 14, 15. So that we may attain the desired spacial relative position of the propeller shafts with reference to each other, the stator or poles of the exciting winding of the synchronous machine 12 may be reinterchanged with the aid of a pole interchanger 16. By such interchanging of the poles, the shaft 8 is rotated with reference to the shaft 7 displaced by one pair of pole elements. The excitation current for the synchronous machine is supplied by an exciting machine 17 which is driven from shaft 8 through a belt drive 18.

To excite the stator or field windings of the synchronous machines, the attendant presses push button 20. When push button 20 is actuated it bridges contact members 21 so that the exciting windings 19 of the exciting machine are connected to the armature of the exciting machine through the conductors 46, 47. As soon as the voltage of the self-excited machine 17 is sufficiently high, the relay 24 operates and closes its contact members 25 so that indicating, or signal, lamp 26 becomes lighted. From this signal light the operator, or attendant, recognizes that the starting operation is at an end. He may now release push button 20, since relay contact members 25 are in a circuit connected in parallel to contact members 21. Resistors 27 and 28 are connected in series and in parallel, respectively, with the exciting windings 19 of the exciting machine 17. These resistances are so connected that when starting push button 20 is actuated, they are bridged. In this manner it is possible to increase the voltage of the exciting machine very quickly. With the aid of a push button 23 the excitation may be disconnected.

When it happens that the current flowing in conductors 13, 14, 15 excites them a predetermined value, bimetallic relay 30 closed through current transformer 29 operates and excites auxiliary relay 31 so that in this case its fixed contact members 32 lying in the exciting circuit of relay 24 are opened. In this case also the exciting current is accordingly disconnected.

For indicating the relative position of the drive shafts, impulse producers are provided and indeed an impulse producer is associated with each of the Diesel engines and an impulse producer is associated with each of the propellers. The impulse producers 33 and 34 associated with the Diesel engines are influenced by the respective control elements 44 and 45 of the Diesel engines. The impulse producers 35 and 36 for the propellers 1 and 2 are, in the embodiment shown, directly influenced by the propellers. The impulses are produced electromagnetically. Each impulse producer has an electromagnet which is excited with direct current from the ship network 41, 42. A switch 43 serves to connect in the exciting current. The impulse producers are so constructed that the elements 44 and 45 and 44' and 45' are rigidly secured to the shafts that are to be equalized, i. e., to the control shafts of the Diesel engines and to the iron parts of the propellers. These shafts and iron parts running past the fixed electromagnets of the impulse producers produce a sharp impulse of current in the secondary windings mounted thereon. The secondary windings of the impulse producers 33 and 34 associated with the Diesel engines are connected in parallel as shown in the drawing. The impulses produced by these impulse producers are connected to the terminals 38 of an indicating instrument, as a volt meter, having the pointer 40. In similar manner the secondary windings of the impulse producers 35 and 36 are so connected in parallel that the impulses are conducted to the terminals 37 of an indicating instrument, as a volt meter, having the pointer 39. The indicating instruments, or volt meters, are combined in one case so that both the pointers 39 and 40 may be readily inspected. Each volt meter is so adjusted that the indicators, for example, are at rest in the illustrated position when all of the impulse producers indicate that the associated shafts are related to each other in the desired spacial relationship. In all other cases, depending on the phase position of the impulses, either both or one of the pointers is deflected. In practice the pointers change their position in a completely determined rhythm so that the operator may, without more, determine from the indications of the pointers 39 and 40 on the face of case 48 how far one shaft is displaced from the desired position with reference to the other shaft. By operating the pole changer 16, the proper relative position may be attained in a simple manner.

When a large number of rotations of the shafts 7 and 8 relative to each other is required, to again attain the corresponding position after the desired spacial position has been left, we may proceed by adjusting one of the Diesel engines to operate at a somewhat higher speed than the other so that one of the Diesel engine shafts leads the other. By the deflections of the pointers 39 and 40, the operator recognizes the moment at which he must synchronize the shafts by connecting in the exciting machine 17. At this juncture he need only press on the push button 20 and may even without operating the pole changer connect the proper relative position of the shafts, since the shunting of the resistors 27 and 28 makes possible a very quick excitation of the holding machines.

In deviating from the exemplified embodiment, the invention may be practically so constructed that in place of the indicating instruments, a pair of regulating instruments 148 may be utilized. The latter automatically produce impulses for operating the pole changer 116 until the desired relative position of the shafts is obtained. Again it is possible at sufficiently quick excitation of the leading machine to lead in the excitation process at the desired moment from the regulation instrument 148 itself without the supplementary rotation of the shafts to the desired position with the aid of a pole changer. For plants of the type described in the embodiment shown in Fig. 2, a mechanically operating regulating or indicating device may be utilized in which the relative positions of the shafts to be compared may be compared by suitably selected translational drives. In this connection the translational drives have the function of translating the motion of all of the shafts belonging to a driving aggregate into a rotational motion which, with the aid of a differential drive permits the recognition on a mark present in the apparatus when the desired relative position to the shafts to be equalized to the other driving aggregate is attained.

With the modification shown in Fig. 2 the pointers 139 and 140 operate exactly as do pointers 39 and 40 shown in Fig. 1 but in this pair of instruments, or devices, 148, a pair of contact operating levers 160 and 161 pivoted at 162 and 163 are provided so as to effect the opening of the respective contact members shown associated with the levers.

In the showing in Fig. 2 the movable armature 164 for the pole changers 116 is shown energized when the pointers 139 and 140 are not in the desired position. When the shafts 3, 4, 7 and 8 are in synchronism and in phase, both levers 160 and 161 are operated and in consequence the movable armature 164 is released. The pole connections of machine 12 are thus changed and as a result machine 12 will be displaced by one pair of poles from machine 11. It should be noted that if one of the machines, either 11 or 12, should slip a pole so that the shafts 3, 4, 7 and 8 are not properly positioned, the pole connections of one of the machines is automatically changed by the coaction of devices 148 and 116 to again position shafts 3, 4, 7 and 8 in the desired position.

Since both of the contact members or switches controlled by the respective pointers 139 and 140 are in parallel circuit relation, both pointers 139 and 140 must be in a given position before the actuating coil for the device operating the pole changer 116 is deenergized. In other words, when all the shafts, as 3, 4, 7 and 8, are in the given position, then the pole changer 116 is actuated. With the construction shown the pole changer 116 is actuated from whatever position it may hold to a different position. This is so because as the armature of device 164 descends, the dog 200 operates the latch lever 202 in a counter-clockwise direction and also operates the arms of the pole changer in a counter-clockwise direction to change the pole connection from the one shown to a different connection. As the pole changer moves counter-clockwise, the latch lever 203 acted upon toward the left by the spring 204, latches the pole changer into the actuated position. If the pole connection is other than shown in Fig. 2 and the coil of device 164 is deenergized, then dog 201 actuates both the latch lever 203 and the pole changer clockwise to change the pole connection.

I claim as my invention:

1. In an apparatus for synchronizing a plurality of machine elements in such manner that the elements hold a predetermined out-of-mechanical-phase position during operation, in combination, a plurality of machine elements, means for operating the elements so that one group operates at a substantially constant speed whereas the other group are operated at a variable speed either above or below the substantially constant speed, means for indicating the instant when the group of elements operated at variable speed are for the moment in exact synchronism with the means operating at substantially constant speed, and electric interlocking means operable when said indicating means indicate exact synchronous operation of all the elements, adapted to electrically interlock said elements to positively effect isochronous operation of all the elements.

2. In a system of control for controlling the operation of a pair of shafts, in combination, a pair of shafts, substantially like machines coupled to the respective shafts, said machines having like rotating elements which are normally to operate at the same speed and in mechanically out-of-phase position, a pair of means for driving the respective shafts, means for indicating when the shafts and thus the rotating elements, are operating at the same speed and mechanically in phase, and means, operable when the indicating means indicate that the shafts are operating at the same speed and mechanically in phase, adapted to substantially lock the shafts into relative out-of-mechanical-phase operative position.

3. In a system of control for controlling the operation of a pair of shafts, in combination, a pair of shafts, substantially like machines coupled to the respective shafts, said machines having rotating elements which are normally to operate at the same speed but in a mechanically out-of-phase position, a pair of means for driving the respective shafts in such a manner that the shafts will at some instant be operating at the same speed and mechanically in phase, electro-magnetic means for maintaining the shafts in any selected mechanical phase position during operation, means, operable when the shafts and thus the rotating elements are operating at the same speed and are in phase, adapted to automatically energize said electro-magnetic means in such manner that said electro-magnetic means maintains said shafts and thus the elements at the same speed and in a given out-of-mechanical-phase position.

4. In a system of control for controlling the operation of a pair of shafts, in combination, a pair of means for rotating the respective shafts, indicating means, responsive to the operation of both shafts, adapted to indicate when exact synchronous operation of the shafts occurs, namely, when corresponding points radially of the axes of rotation of the shafts are moving at the same angular velocity and are mechanically in phase, and means responsive to said indicating means adapted to automatically change the said synchronous operation of the shafts to continuous isochronous operation, namely, to an operation of the shafts so that corresponding points radially of the axes of rotation of the shafts move at the same angular velocity but are mechanically out of phase.

HANS WOLTERS.